United States Patent [19]
Vandenbroucke

[11] Patent Number: 5,107,695
[45] Date of Patent: * Apr. 28, 1992

[54] ROLL FORMER AND/OR CUTTER WITH QUICK AUTOMATED TOOL

[76] Inventor: Jacky Vandenbroucke, 1493, Bachand, Carignan, Quebec, J3L 4E6, Canada

[*] Notice: The portion of the term of this patent subsequent to Dec. 4, 2007 has been disclaimed.

[21] Appl. No.: 598,409

[22] Filed: Oct. 17, 1990

Related U.S. Application Data

[63] Continuation-in-part of Ser. No. 425,061, Oct. 20, 1989, Pat. No. 4,974,435.

[30] Foreign Application Priority Data

Oct. 17, 1989 [CA] Canada ............................ 2000836
Nov. 23, 1989 [CA] Canada ............................ 2003702

[51] Int. Cl.⁵ .................... B21B 31/14; B26D 7/26; B26D 1/143
[52] U.S. Cl. ............................ 72/129; 72/176; 72/179; 72/226; 72/249; 83/479
[58] Field of Search ............... 72/226, 181, 179, 176, 72/249, 129; 83/479, 480, 508.1

[56] References Cited

U.S. PATENT DOCUMENTS

| | | | |
|---|---|---|---|
| 494,904 | 4/1893 | Story | 72/226 |
| 1,433,910 | 10/1922 | Ricci | 83/479 |
| 1,443,164 | 1/1923 | Bracken . | |
| 1,570,940 | 1/1926 | Cameron | 83/480 |
| 2,393,586 | 1/1946 | Bruker | 83/479 |
| 3,306,197 | 2/1967 | Jensen et al. . | |
| 3,318,130 | 5/1967 | Sendzimir | 72/226 |
| 3,400,657 | 9/1968 | Fulks . | |
| 3,453,852 | 7/1969 | Valente | 72/226 |
| 3,730,080 | 5/1973 | Deligt . | |
| 3,901,060 | 8/1975 | Corradini | 72/179 |
| 4,286,451 | 9/1981 | Chang | 72/181 |
| 4,557,129 | 12/1985 | Lash et al. | 72/181 |
| 4,776,194 | 10/1988 | Chang | 71/179 |
| 4,787,232 | 11/1988 | Hayes | 72/181 |
| 4,903,516 | 2/1990 | Olsson | 72/226 |

FOREIGN PATENT DOCUMENTS

| | | | |
|---|---|---|---|
| 1059 | 1/1885 | Fed. Rep. of Germany | 72/179 |
| 1627297 | 11/1970 | Fed. Rep. of Germany | 83/479 |
| 2816993 | 10/1979 | Fed. Rep. of Germany | 72/226 |
| 3041 | 1/1980 | Japan | 72/226 |

*Primary Examiner*—Daniel C. Crane
*Attorney, Agent, or Firm*—Foley & Lardner

[57] ABSTRACT

The apparatus comprises a pair of rotatable devices (9,11) each holding a plurality of metal shaping and/or cutting rollers (17,19;127), the rollers of one device meshing with rollers of the other device to produce specific designs or widths of material. This is made possible by merely selecting suitable rollers of both sets and when production of a specific metallic section or desired widths are terminated, other rollers are selected by rotating the rotatable devices, if another metallic section or widths are desired. When suitable rollers (17,19:127) have been selected they are locked in operating position and the operation is allowed to proceed by feeding metal strip to the machine. When another design or widths are required, the devices are unlocked, a selection is made, and the devices are again locked to produce the new metallic section or widths of material.

11 Claims, 6 Drawing Sheets

ROLL FORMER AND/OR CUTTER WITH QUICK AUTOMATED TOOL

CROSS-REFERENCE

This application is a continuation-in-part of U.S. Ser. No. 425,061 filed Oct. 20, 1989, now U.S. Pat. No. 4,974,435, issued Dec. 4, 1990.

BACKGROUND OF INVENTION

1. Field of the Invention

The present invention relates to an apparatus for manufacturing shaped sections and/or widths of material by feeding strips of material between mated pairs of cooperating shaping and/or cutting rollers. More particularly, the present invention is concerned with a device which enables to substantially instantaneously change over from one set of cooperating rollers to another set in order to start producing a different section and/or different widths of material, without having to interrupt the production line for an important period of time. Specifically, the present invention relates to a roll former and/or cutter with quick automated tool changer. The invention is of particular interest for the production of shaped metallic sections but is not restricted thereto.

2. Description of Prior Art

In the manufacture of shaped metallic sections, it is well known that whenever a new design is to be produced, the operation of the machine must come to a halt, and the various metal shaping rollers have to be dismantled and replaced by others which will give the new design. This operation will cause the machine to be out of use for a period which sometimes may extend up to three or four days. In addition to being cumbersome and time consuming, since the change over means a substantial loss of production time, this operation is obviously extremely costly due to the lack of production during that period.

In the field of shaping and/or cutting of sheet metal or other like material, the prior art would not seem to suggest an easy way to change over from one set of rolls to another when a new design is required for the manufacture of shaped metallic sections. U.S. Pat. No. 3,306,197 relates to alternative print drums for applying indicia to one surface of a moving sheet or web. These drums are alternatively usable by rotating a common shaft carrying them. U.S. Pat. No. 1,443,164 on the other hand describes a plurality of rotatable marking wheels enabling wheel changes to suit pieces to be marked. German Patent 77 373 to Hof describes a system of selective mating rollers in which each roller can be operatively connected to its own motor driving means. There is no disclosure as to how the two sets of rollers can be precisely rotated so that two rollers are precisely engaged with one another and how to lock these rollers in that position. Snowden German 1059 of Jan. 1885 and Storey U.S. Pat. No. 494,904 merely show turrets carrying a plurality of rollers. Hitachi Japanese 3041 of Jan. 1980 describes a rolling mill including intermediate rolls disposed around back up rolls. The device includes a turret with some kind of lacking device. Corradine U.S. Pat. No. 3,901,060 describes a forming station wherein a support for the forming roller is movable in the direction of the shafts, to engage and disengage from the shaft. Hayes U.S. Pat. No. 4,787,232 describes a roll forming member where spaced adjustable frames are provided to support the rollers. Valente U.S. Pat. No. 3,453,852 teaches a plurality of turrets carrying rolls which can be adjusted or turned. Other references of interest include U.S. Pat. Nos. 3,318,130; 3,400,657; 3,730,080; 4,286,451; 4,557,129 and 4,776,194.

It will be noted that the prior art does not teach the rapid change of shaping and/or cutting rollers in apparatuses for forming shaped sections, or different widths.

SUMMARY OF INVENTION

It is therefore an object of the present invention to provide a machine including a plurality of shaping and/or cutting rollers adapted to produce various preselected designs and/or widths and which can be rapidly changed over to vary the designs of the shaped sections or the widths of the cut material.

In accordance with the present invention, there is provided an apparatus for manufacturing shaped or cut sections by feeding strips of material, for example metal strips between mated pairs of cooperating shaping and/or cutting rollers, and obtaining different sections and/or widths therewith. The apparatus comprises first rotatable means holding a plurality of first shaping and/or cutting rollers and second rotatable means mounted opposite the first rotatable means and holding a plurality of second shaping and/or cutting rollers. The first shaping and/or cutting rollers are formed with specific shaping and/or cutting patterns which differ from roller to roller, and the second shaping and/or cutting rollers are shaped so that a given second roller meshes with one only first roller. There are provided means enabling to rotate the first rotatable means and the second rotatable means so as to oppositely dispose a given first roller and a corresponding second roller to provide a strip of material with a predetermined section and/or width, means locking the first and second rotatable means in positions relative to one another corresponding to predetermined shaped sections and/or widths, and means to unlock the first and second rotatable means from a given locked position producing predetermined shaped section and/or width, and to rotate same into another locked position producing a different section and/or width.

BRIEF DESCRIPTION OF DRAWINGS

The invention will now be illustrated by means of two embodiments, it being understood that the invention is not limited to these embodiments. In the drawings, which illustrate the invention.

DESCRIPTION OF PREFERRED EMBODIMENTS

Figure 1:
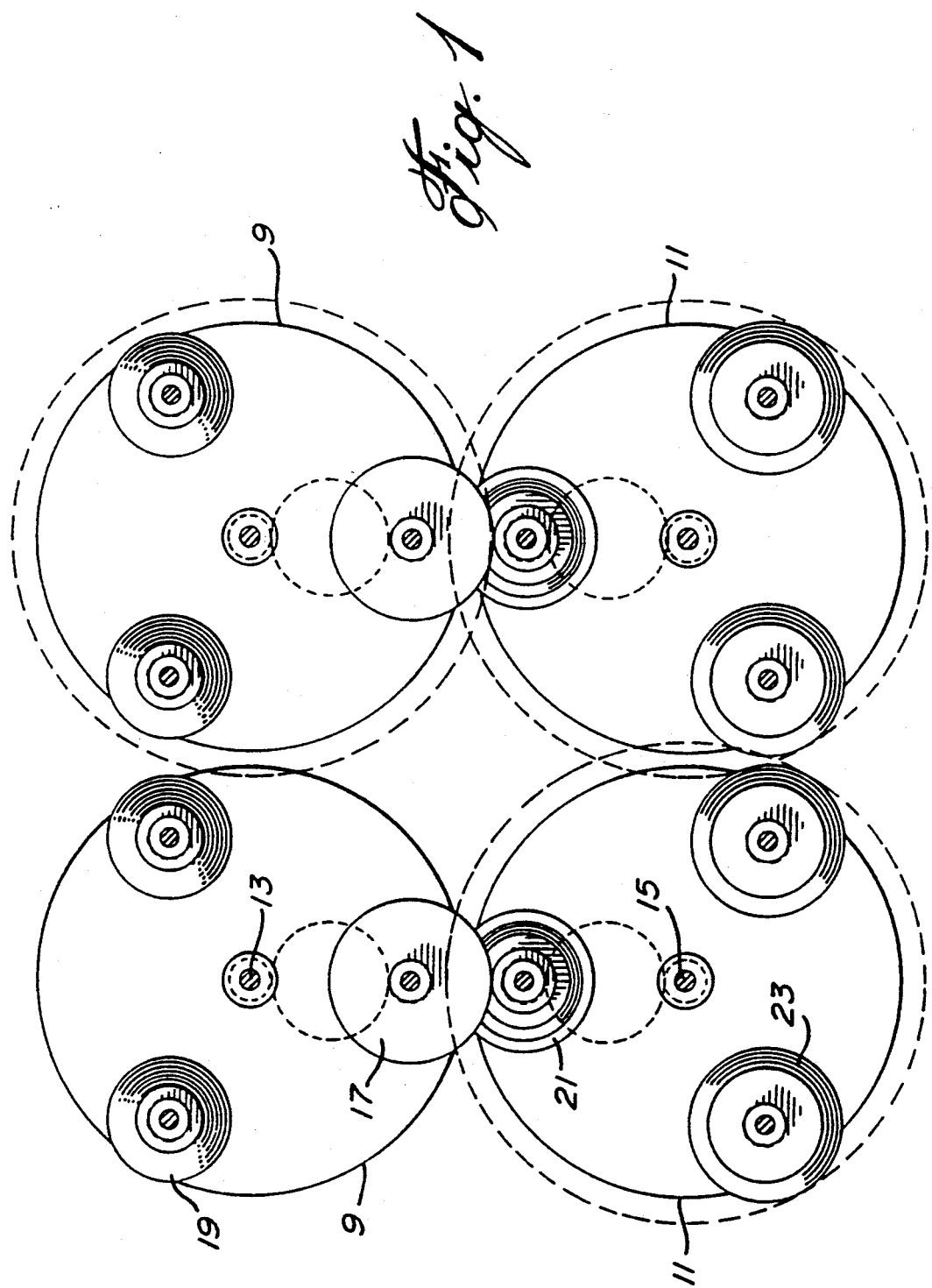
FIG. 1 is a schematic representation of a roller holder arrangement according to the invention.

With reference to the drawings of FIGS. 1 to 4 which illustrate a preferred embodiment to which the present invention is not necessarily restricted, it will be seen that the apparatus which is illustrated generally comprises a housing which includes an inner frame support 1 and an outer frame support 3, each being vertically mounted respectively on base supports 5 and 7. Between the frame supports 1 and 3, there are disposed an upper turret head 9 and a lower turret head 11, both being rotatable around horizontal axes defined by shafts 13 and 15.

Figure 2:
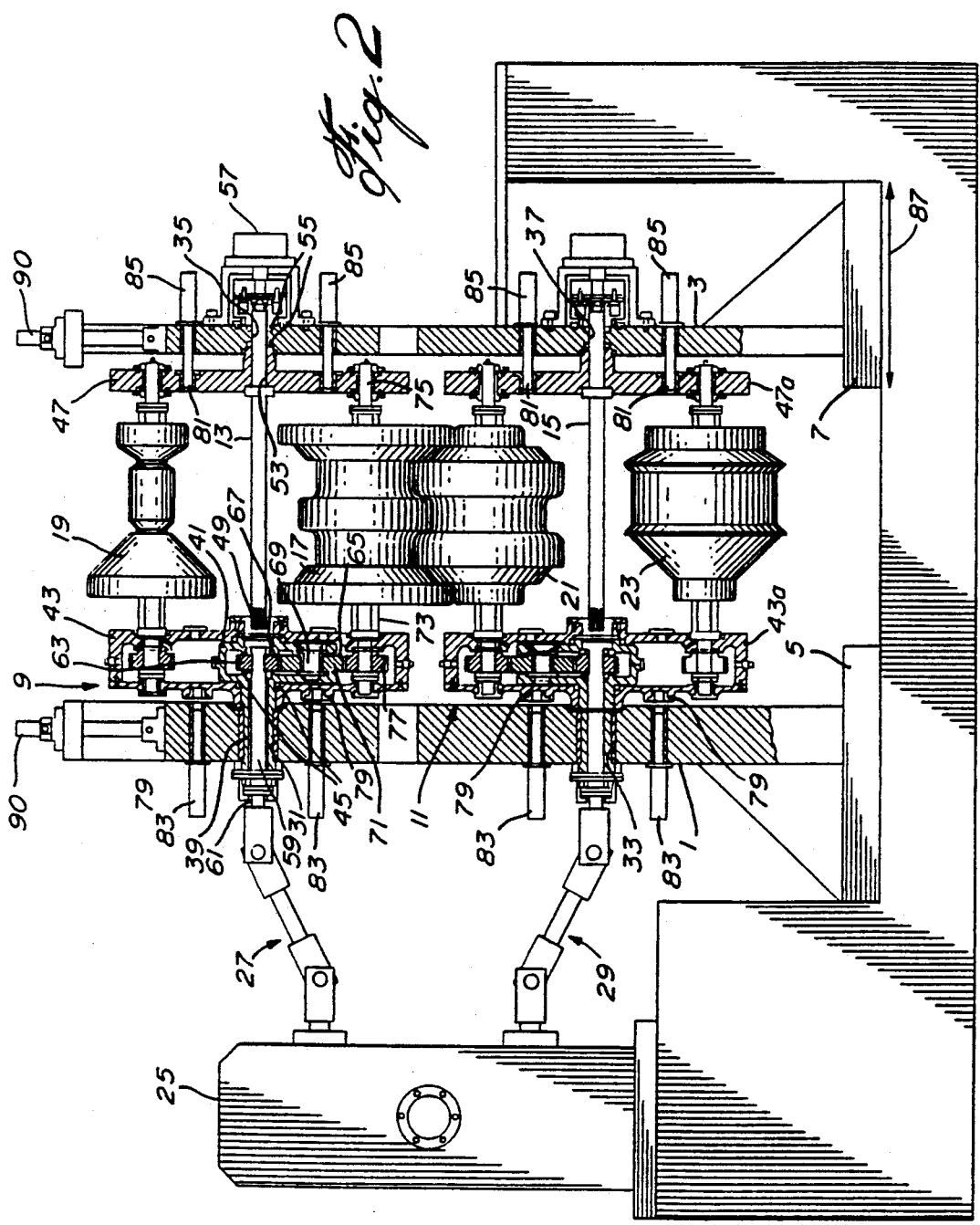
FIG. 2 is a view in elevation partly in cross-section of an apparatus for manufacturing shaped metallic sections according to the invention.

FIG. 2 shows only two rollers being carried by each upper and lower turret head 9 and 11, namely upper rollers 17 and 19 carried by upper turret head 9 and rollers 21 and 23 carried by lower turret head 11. Of course, since we are dealing with the field of metal shaping and/or cutting, the rollers are intended to be used in pairs to complement one another. For example, roller 17 is intended to be used along with roller 21, while roller 19 is intended to be used along with roller 23. In addition, although FIG. 2 shows only two rollers for each turret head, it is obvious that a turret head will normally carry at least two and most of the time more than two, e.g. three or more rollers as shown schematically in FIG. 1. In addition a machine can consist of a succession of upper and lower turret heads 9, 11 if the pattern needed requires it, it being understood that a pair of upper and lower turret heads will be equivalent in construction to any other pair following it. The present invention will therefore be described with reference to a single pair of oppositely disposed upper and lower turret heads, although a machine according to the invention may comprise a plurality of such pairs.

Included with the machine is of course a driving unit which includes a reduction unit 25 and two universal couplings 27, 29 which will be used to drive an upper and a lower roller for the purpose of producing a particular design or cut. Of course, other means of driving the shaping rollers can be used as will readily be apparent to one skilled in the art without departing from the scope and spirit of the present invention, such as those illustrated in FIG. 5 which will be discussed more in detail hereinafter.

The inner frame support 1 is formed with an upper bore 31 and a lower bore 33, while the outer frame support 3 has an upper opening 35 which is in exact alignment with the bore 31 and a lower opening 37 which is in exact alignment with the bore 33. A sleeve 39 is disposed in known manner in bore 31 and it will be noted that the sleeve 39 extends exteriorly of the bore 31, on the side of the frame support 1 facing frame support 3, into a gear housing 41. The turret head 9 therefore will be seen to consist of a rotary roller holder 43 which is mounted over the gear housing 41 and is adapted to rotate relative thereto by means of a system of ball bearings 45 as is well known to those skilled in the art. The turret head also comprises roller holder 47 which is mounted on the shaft 13 and is adjacent to the outer frame support 3, all as shown in FIG. 2 of the drawings.

The rotary roller holders 43 and 47 are connected together by means of shaft axle 13 which is fixedly engaged at one end at 49 in the central part of the rotary roller holder 43 while the other end of the shaft axle 13 extends through a bore 53 provided in the rotary roller holder 47 and through the opening 35 provided in the other frame support 3 where it is freely rotatable by being supported with a system of ball bearing 55, into a ratchet clutch 57 which enables, in known manner, to precisely rotate the turret head when a change of metal shaping rollers is indicated. Of course, the turret head 11 may be rotated by other means known to those skilled in the art without departing from the present invention. It will therefore be seen that since the rotary roller holder 43 is freely rotatable over the gear housing 41, and the rotary roller holder 47 is fixedly mounted on the shaft axle 13 while the latter has its outer end freely rotatable in the opening 35, the turret head 9 can easily be rotated around the shaft axle 13 until a suitable metal shaping roller is placed in a position, in cooperation with an appropriate lower roller, to provide a specific metallic section or cut in a strip of metal.

Although this invention is being described only with reference to turret head 9, it is obvious that turret head 11 is similar in all respect except that it is a mirror of turret 9. The description will therefore be restricted exclusively to turret head 9.

Referring again to the drawings, it has been mentioned above that the sleeve 39 extends into a gear housing 41 which is located inside the rotary roller holder 43. The gear housing 41 contains a gear driving mechanism which is intended to transmit motorized power from the motor 25, via universal joint 27, to a selected metal shaping roller such as 17 as illustrated in FIG. 2 of the drawings.

For this purpose, there is provided a driving shaft 59 which is rotatably mounted in the sleeve 39 and is coupled in known manner at its inner end 61 to the universal joint 27. At the outer end of the driving shaft 59, inside the gear housing 41 there is a fixedly mounted gear 63. A gear 65 which meshes with the gear 63 at 67 is mounted on a shaft portion 69 over which it is allowed to freely rotate. The gear 65 is allowed to partly extend outside gear housing 41 at 71.

At this time, it is essential that the mounting of the metal shaping roller 17 with respect to the rotary roller holders 43 and 47 be described, it being understood that all the other metal shaping rollers 19, 21, 23 and others which may be associated with rotary roller holders will be the same. The metal shaping roller 17 is fixedly mounted, in known manner, over a roller shaft 73 having an end 75 rotatably mounted in the rotary roller holder 47 while the other end is provided with a gear 77 which is fixedly mounted over the roller shaft 73 and is engageable with portion 71 of the gear 65. It will therefore be seen that when a metal shaping roller, such as 17, is placed in operating position as shown in the drawings, gear 77 will engage with gear 65 which is engaged with gear 63 the latter being rotated through shaft 59, universal coupling 27 and reduction unit 25. In other words, when one specific metal section is required, the upper rotary roller holders 43 and 47 as well as the corresponding lower rotary roller holders 43a and 47a are rotated until appropriate upper and lower metal shaping rollers are placed opposite one another, such as 17 and 21 as shown in the drawings, with the gear 77 being engaged by the gears 65 which is engaged by the gear 63. The result would be a production of a metal section shaped by the rollers 17 and 21.

The rotary roller holder 43 contains a number of locking bores 79 while the rotary holder 47 contains a corresponding number of locking bores 81. A corresponding number of spring loaded locking pins (and/or air cylinders) 83 are transversely mounted in frame support 1 and similar locking pins 85 are transversely mounted in frame support 3. These pins are well known to those skilled in the art. The only requirement is that they should be insertable in appropriate bores 79 or 81 upon proper alignment. When the pins are engaged in the locking bores, the apparatus is locked in a position where two cooperating rollers are adapted to produce a particular metallic section or cut. When a change over of design or cut is needed, the spring loaded locking pins 83, 85 are pulled from the bores 79, 81, the roller holders are rotated until cooperating rollers capable of forming a new design or cut are placed opposite one another and the pins are thereafter inserted into the locking bores.

In order to impart flexibility to the device according to the invention, for example to enable it to be used in conjunction with rollers of various lengths, it is preferable that the inner frame support 1 be fixed relative to the base support 5 while the outer frame support 3 is mounted in known manner on base support 7 to be movable in the direction indicated by arrow 87 as illustrated in FIG. 2. In this manner, rollers of various lengths can be used with the machine according to the present invention. The arrangement will hereinafter be referred to as the duplex mode of the device according to the invention.

Figure 3:
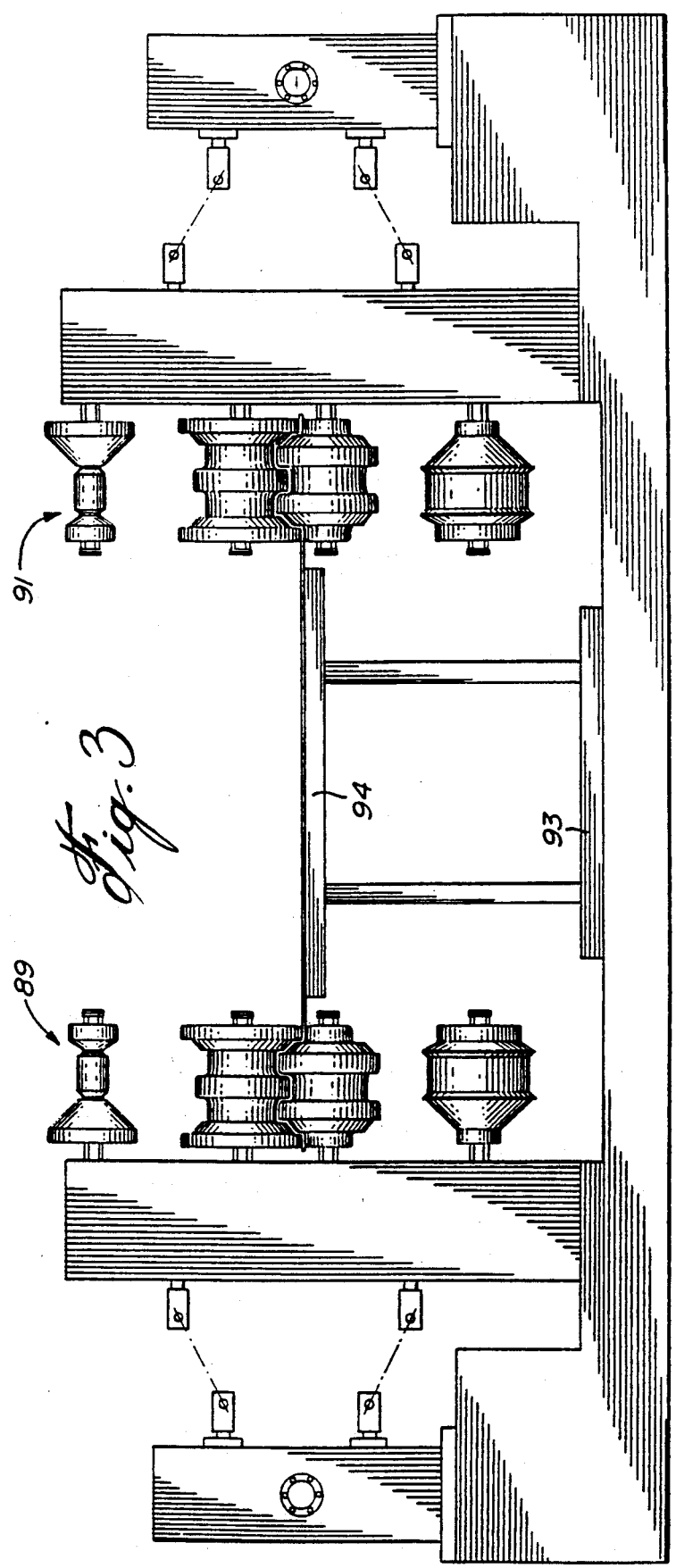
FIG. 3 is a schematic illustration of a frame support and rollers to be used when the device operates simultaneously with two sets of rollers in an internal duplex mode, one set of rollers being movable with respect to the other set.

Referring to FIG. 3, there is schematically illustrated an internal duplex mode. The system includes two series of rollers 89, 91 on the same base 93. An adjustable device not shown enables to adjust the space between the two sets of rollers to permit the shaping of both edges of a strip which may vary in width. The strip is supported at 94 between the two sets of rollers.

Figure 4:
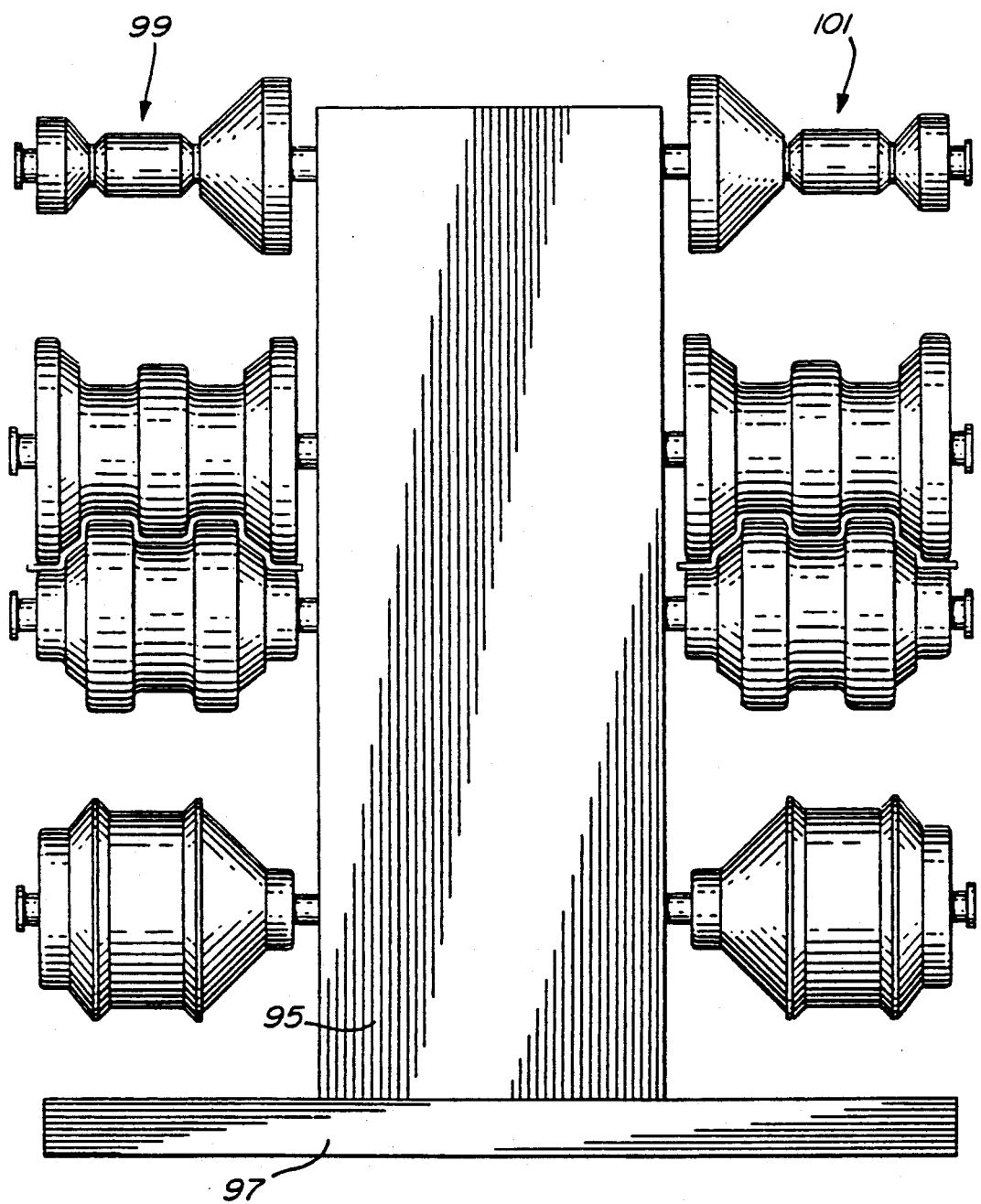
FIG. 4 is a schematic illustration of a frame support and rollers to be used when the device operates simultaneously with two sets of rollers in an external duplex mode, the two sets operating independently.

Referring now to FIG. 4, there is schematically illustrated an external duplex mode. In other words, there will be provided an intermediate frame support 95 which is mounted on a base 97. The intermediate frame support 95 holds a pair of roller holders 99,101 on either sides thereof so as to enable the device to hold two groups of rollers, thereby enabling to produce two different metallic sections on the same machine by separately feeding metal strips on both sides of the apparatus.

Finally, it is desirable that the pressure that rollers 17 exert on rollers 21 be adjustable when forming a particular metallic section. For this purpose an adjusting system 90 well known to those skilled is provided on both frame supports 1 and 3, which permits to adjust the pressure exerted by rollers 17, all as shown in FIG. 1.

Although the invention has been described with reference to the turret head 9, as mentioned above, it will be understood that turret head 11 is the same except that it is a mirror of the latter.

In addition, with reference to FIG. 1, it is obvious that the invention can be used with a succession of rollers according to the invention if the design of the metallic shape so requires.

Figure 5:
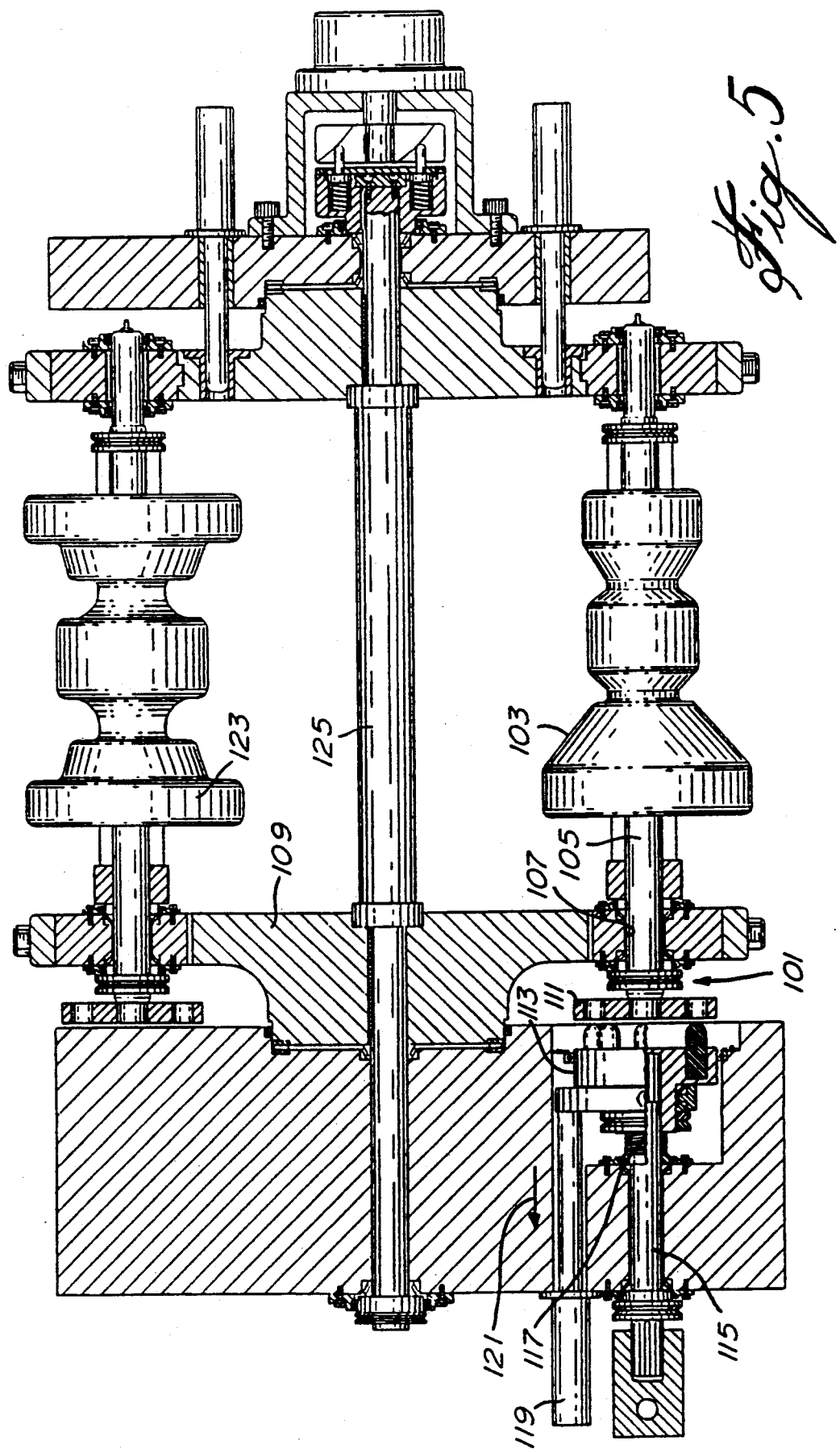
FIG. 5 is a view in elevation, partly in cross-section of another embodiment relative to the driving of the rollers.

Turning now to the embodiment illustrated in FIG. 5, it will be seen that instead of using a system of meshing gears 63, 65, 77 to drive a metal shaping roller, the latter can be driven by means of a clutch 101. This arrangement permits to connect the metal shaping roller 103 directly to a reduction unit (not shown) without having to provide for a universal joint as it is the case for the embodiment illustrated in FIG. 2. The metal shaping roller 103 is therefore, in known manner, fixedly mounted over shaft 105 which extends through a bore 107 formed in rotary roller holder 109 and terminates into a female clutch plate 111. For the rotation of the shaft 105 and consequently of the metal shaping roller 103, there is provided a male clutch plate 113 which is fixedly mounted at the end of axle 115 but is resiliently and longitudinally movable relative thereto for engagement and disengagement with the female clutch plate 111. In normal operation the male clutch plate will be engaged into the female clutch plate as a result of the pressure exerted by spring 117. Disengagement is carried out but pulling the handle 119 in the direction of arrow 121, which enables then another metal shaping roller 123 to be rotated around axle 125 and to be engaged by the axle 115. Otherwise, the system is as illustrated in FIG. 2.

Figure 6:
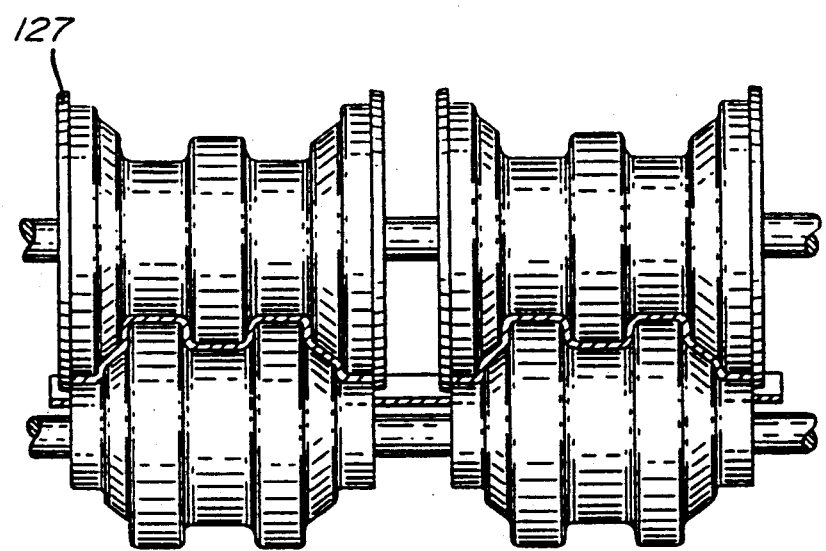
FIG. 6 is a sketch showing that the rollers can also cut metal sheets.

Finally, with reference to FIG. 6, it will be seen that the apparatus according to the invention may also be used for cutting as well as for forming. It is merely necessary that they be provided with cutting edges 127.

Although the invention has been illustrated with reference to strips of metal which can be converted to specific metallic sections, it will be obvious that this apparatus can be used with strips of any kind of material, such as plastic sheets, paper, cardboards, etc. to produce a variety of patterns. Also, the rollers may be provided with cutting means to provide shaped sections as well as longitudinally cut sections of predetermined width. The apparatus obviously can be used to produce shaped sections, with or without specific longitudinal cuts or exclusively specific widths of material.

I claim:

1. Apparatus for manufacturing shaped or cut sections by feeding strips of material between mated pairs of cooperating shaping and/or cutting rollers, and obtaining different sections and/or widths with said apparatus, said apparatus comprising upstanding inner and outer frame supports a first and a second turret head rotatably mounted on said inner and outer frame supports, with said first turret head oppositely disposed above said second turret head, said first and second turret head respectively holding a plurality of first and second shaping and/or cutting rollers, said first shaping and/or cutting rollers being formed with specific shaping and/or cutting patterns which differ from roller to roller, said second shaping and/or cutting rollers being shaped so that a given second roller meshes with one only first roller, wherein each frame support has a lower bore and an upper bore formed therein, driving shafts extending through said lower bore and said upper bore and drivingly connected respectively through said first turret head and said second turret head to rotate a selected one of said first rollers and a corresponding second roller, each said turret head comprising a first rotary roller holder rotatably mounted relative to said inner frame support and a second rotary roller holder rotatably mounted relative to said outer frame support, said first and first and second rotary roller holders being connected together by means of an axle which is fixedly engaged at one end at central part of said first rotary roller holder and at the other end at central part of said second rotary roller holder, so that rotation of said first rotary roller holder induces rotation of said second rotary roller holder and vice-versa, the other end of said axle extending through an opening provided in said outer frame support into a ratchet clutch enabling to precisely rotate said turret head when a change of first and second rollers is indicated, means locking said first and second turret heads in positions relative to one another corresponding to predetermined shaped sections and/or widths, and means to unlock said first and second turret heads from a given locked position producing predetermined shaped sections and/or widths, and to rotate same to another position producing a different section and/or widths.

2. Apparatus according to claim 1, which comprises a sleeve fixedly mounted in each bore of said inner frame support, said sleeve extending exteriorly of said bore into a gear housing, said first rotary roller holder being rotatably mounted over said gear housing, gear driving means mounted in said gear housing, said driving shaft rotatable in said sleeve and operatively connected to said gear driving means, and means enabling said gear driving means to cause rotation of said selected roller.

3. Apparatus according to claim 2, wherein said gear driving means comprise a first gear fixedly mounted at one end of said driving shaft, a second gear which is freely rotatable in said gear housing and is engaged with said first gear, and said means to cause rotation of a roller comprise a roller shaft drivingly supporting said roller, said roller shaft having one end rotatably mounted in said second rotary roller holder, the other end of said roller shaft having a third gear fixedly connected thereto, said third gear being engageable with said second gear, and reduction means to rotate said driving shaft thereby causing rotation of said roller when said third gear engages with said second gear, so that when one specific section or cut is required the upper and lower first and second roller holders are rotated until appropriate upper and lower rollers are placed opposite one another with the third gears engaging the second gears and the motor means are operated to cause rotation of said appropriate rollers and production of a shaped section or cut.

4. Apparatus according to claim 3, which comprises locking bores provided in said upper and lower roller holders, a corresponding number of spring lbaded locking pins transversely mounted in said inner and outer frame supports and simultaneously insertable each in one said locking bore to lock said roller holders, and when a change over of design is needed, said spring loaded locking pins are removed from said bores, said roller holders are rotated until cooperating rollers are placed opposite one another, and said pins are thereafter inserted into said bores.

5. Apparatus according to claim 1, which comprises means enabling to adjust pressure exerted by said first rollers on said second rollers.

6. Apparatus according to claim 1, which comprises means to adjust distance between said inner and outer frame supports in order to dispose rollers of various lengths therebetween.

7. Apparatus according to claim 1, which comprises two sets of said first and second rollers, means enabling to adjust distance between said two sets, and means to support a strip between said two sets, so as to shape or cut both edges of a strip which may vary in width.

8. Apparatus according to claim 1, which comprises an intermediate frame support and a set of said first and second rollers on either side of said intermediate support, thereby enabling to produce, two different sections or cuts on a same machine by separately feeding strips on both sides thereof.

9. Apparatus according to claim 1, wherein said driving shaft is directly connected to a driving means including a reduction unit, each said metal shaping roller is operatively mounted over a respective roller shaft and clutch means to operatively connect said driving shaft and said roller shaft.

10. Apparatus according to claim 9, wherein said clutch means comprises resiliently engageable male and female clutch plates respectively provided at the ends of said driving and roller shafts.

11. Apparatus according to claim 10, which comprises a male clutch plate operatively mounted at the end of said driving shaft, said male clutch plate being longitudinally movable relative to said driving shaft, a female clutch plate operatively mounted at the end of said roller shaft, a handle connected to said male clutch plate and a spring mounted around said driving shaft behind said male clutch plate, so that said male clutch plate is normally in engagement with said female clutch plate, and when disengagement is required, said handle is pulled against said spring.

* * * * *